United States Patent Office 3,819,764
Patented June 25, 1974

3,819,764
PROCESS FOR THE GRAFTING OF STYRENE ONTO POLYMERIC BUTADIENE OR ISOPRENE PREREACTED WITH AN ALKYL LITHIUM OR SODIUM AND A SEC-ALKYL CHLORIDE
Adel F. Halasa, Bath, Ohio, assignor to The Firestone Tire & Rubber Company, Akron, Ohio
No Drawing. Filed May 30, 1972, Ser. No. 258,039
Int. Cl. C08f *19/08*
U.S. Cl. 260—877           14 Claims

ABSTRACT OF THE DISCLOSURE

The process described herein involves a method of grafting styrene, etc. onto a polymer of butadiene or isoprene, after the polymer has been pretreated with an alkyl lithium or sodium in the presence of a secondary alkyl chloride to prevent the formation of styrene homopolymer or large blocks of polystyrene which are otherwise formed.

BACKGROUND OF THE INVENTION

Field of the Invention

This invention relates to the alkyl lithium-secondary alkyl chloride catalyzed grafting of styrene, etc. onto polymeric butadiene or isoprene. More specifically, it relates to such postreactions in which the polymeric butadiene or isoprene has been prereacted with the alkyl lithium or sodium in the presence of the secondary alkyl chloride such as secondary butyl chloride. Still more specifically, it relates to a process for avoiding the formation of styrene homopolymers and of copolymers having large blocks of polystyrene grafted thereon.

Related Prior Art

There are numerous publications, including various patents, which describe the polymerization of butadienes and isoprenes with styrene catalyzed by alkali metal or alkali metal alkyl derivatives. In view of the great difference in the polymerization rate of butadiene or isoprene in comparison with that for styrene, most of the diene in this type of reaction polymerizes first and then as the concentration of styrene in the monomer portion is increased due to consumption of the diene monomer, the styrene is polymerized. Consequently the polymer molecules have a base portion predominantly of diene repeating units and a terminal portion predominantly of styrene.

For many purposes, it is undesirable to have the respective repeating units distributed in this block copolymer pattern, and it is more favorable for various desired properties that the styrene should be more uniformly distributed throughout the polymer molecule, such as in the styrene-butadiene rubber copolymers produced by emulsion polymerization. It would also be desirable to have a higher degree of branching throughout the copolymer molecules, to broaden the molecular weight distribution, to increase the molecular weight without production of gel, and to give better and improved processability.

Attempts to graft styrene onto polymeric butadiene or isoprene by the usual free radical method generally results in gel formation caused by uncontrolled crosslinking, block formation of polystyrene and the formation of considerable amounts of styrene homopolymer.

Generally a "block" of repeating units is defined as a sequence or series of eight or more identical repeating units connected to each other. To avoid what is termed "blocks" it is desirable to have less than eight of such repeating units in sequence and preferably to have these shorter sequences distributed within or branched along the linear polymer chain.

SUMMARY OF THE INVENTION

In accordance with the present invention, it has been found that a polymeric butadiene or isoprene reacted with an alky lithium or sodium in the presence of a secondary alkyl chloride, preferably secondary butyl chloride, can then be reacted with styrene to produce copolymers in which the styrene repeating units are distributed as small branches attached to the diene polymer chain in contrast to having the styrene repeating units congregated in the terminal portions of the block copolymers that would otherwise result. Moreover, it is found that molecular weights are increased without the production of gel; there is a broader molecular weight distribution; and the products have improved processability as compared to the previously produced block copolymers.

In copending application, Ser. No. 258,038 filed the same date herewith, applicant has disclosed and claimed a process in which grafting is effected onto butadiene and isoprene preformed polymers by adding styrene to a solution of the polymer prior to or simultaneously with the addition or lithium or sodium alkyl and a secondary alkyl chloride. However, while the styrene grafted branches are an improvement over the block copolymers or gelled products previously produced by the prior art, there is a substantial amount of styrene homopolymer produced along with the grafted copolymer.

While applicant does not wish to be committed to any particular theoretical explanation or mechanism by which the results of the invention are accomplished, it is believed that the secondary butyl chloride or equivalent chloroalkane reacts with the lithium or sodium at the terminal or terminals of the polymer chain to remove the lithium or sodium as LiCl or NaCl leaving a primary allylic free radical at the end of the polymer chain and butyl free radicals wandering around in the polymer mass. The primary allylic free radical is less stable than a secondary allylic free radical so it has a tendency to exchange with or remove hydrogen on another polymer chain and thereby leave a secondary allylic free radical on a polymer chain further removed from the terminal of the chain. Moreover the butyl free radical also has a tendency to remove hydrogen from the polymer chains and also leaves a secondary allylic free radical somewhere along the length of the polymer chain. These free radical sites spaced along the length of the chain apparently are the initiating sites for polymerization and grafting of the styrene or other vinyl aryl monomer. Since there are more of these resulting by this process along the length of the polymer chain than with the original number of terminal Li or Na atoms, the resultant polymer grafted chains are shorter, generally shorter than eight repeating units, and are distributed more uniformly along the chain and not at the terminals.

Preferred catalysts for conditioning the polymeric butadiene or isoprene for reaction with the styrene are alkyl lithium or sodium compounds. Preferably the alkyl groups have, for example, from 1 to 10, preferably 1 to 8 carbon atoms on which lithium or sodium has replaced hydrogen. Suitable alkyl lithium and sodium compounds include, for example, methyl lithium, ethyl lithium, butyl lithium, amyl lithium, hexyl lithium, 2-ethylhexyl lithium, n-dodecyl lithium, n-hexadecyl lithium and the corresponding sodium alkyls. Unsaturated lithium and sodium hydrocarbons are also operable, such as allyl lithium, allyl sodium methallyl lithium and the like. Compounds containing two or more lithium or sodium atoms per molecule such as dilithobutane, etc., are also suitable, such as disclosed in U.S. Pat. No. 3,317,918.

While the lithium or sodium may be attached to a primary, secondary or tertiary carbon in the alkyl group, primary groups are preferred such as in n-butyl lithium, n-butyl sodium, n-hexyl lithium, n-octyl lithium, etc.

Mixtures of such alkyl lithium and sodium compounds may also be employed. For example, desirable catalysts may be prepared by reacting an initial alkyl lithium or sodium compound successively with an alcohol and then with an olefin such as isopropylene (a technique analogous to the "Alfin" technique), whereby a greater or lesser proportion of the lithium or sodium from the initial alkyl lithium or sodium goes to form lithium or sodium alkoxide and to form a new organo-lithium or sodium compound with the olefin.

By the grafting reaction of this invention the polymers are improved in glass transition temperatures, for example raising them from −100 to −75° C., the processability and green strengths are improved, and the wear and tear properties when fabricated into tires are drastically improved.

The preformed polymers are advantageously conditioned with the metal alkyl and the secondary alkyl chloride at temperatures between 0° C. and 100° C. A reaction temperature of from 30° to 50° C. is preferred. The same temperature ranges are suitable for the vinyl aryl grafting reaction.

While some improvement is noted when as little as five minutes (0.1 hour) of conditioning reaction is effected, it is generally advantageous to precondition the polymer for at least 30 minutes, preferably at least an hour before the styrene is added for grafting. Therefore, for the conditioning reaction as well as for the grafting reaction, the reaction period is advantageously 0.5–8 hours, preferably 1–6 hours.

The preformed conjugated diene polymers are preferably butadiene and isoprene polymers having at least 50% of the conjugated diene therein. In addition to the conjugated diene there may be up to 50% of a vinyl aryl compound copolymerized therein such as the mono-vinyl and mono-isopropenyl derivatives of benzene and naphthalene and nuclear substituted derivatives thereof in which such derivative groups have a total of no more than 12 carbon atoms and are alkyl, aryl, cycloalkyl, alkaryl or aralkyl groups.

The preformed polymer may be prepared by any polymerization method provided it may be purified to remove any catalyst residue, moisture, emulsifiers, etc., that will destroy or interfere with the catalysts used in the conditioning reaction. For example, polymers prepared in an emulsion system are not desirable for this purpose because of the difficulty of removing the emulsifying agents used in the polymerization. These have an adverse effect on the catalysts used in the conditioning reaction.

The polymer is preferably a rubbery polymer having a number average molecular weight, determined by dilute solution viscosity, of 30,000–120,000, preferably 50,000–100,000. The polymer may vary very broadly in the proportions of 1,2 and 1,4 configuration.

The conditioning and grafting reactions are performed in solution, preferably in a hydrocarbon solvent, and advantageously with a polar component present such as tetrahydrofurane or other ether or a chelating amine such as tetramethyl ethylene diamine.

In the conditioning reaction, the lithium or sodium alkyl is advantageously used in a proportion of 0.5–15 gram millimoles per 100 grams of preformed polymer, and the secondary alkyl chloride is used in a proportion of 5–25 millimoles per millimole of lithium or sodium alkyl.

In the grafting operation the amount of vinyl aryl compound is advantageously 5–50 parts per 100 parts of preformed polymer.

In both the conditioning and the grafting operations, the preformed polymer is used in a 5–30 percent, preferably 15–20 percent solution.

Solvents operable in the conditioning and grafting reactions are advantageously non-acidic, organic substances. Preferred solvents include the saturated aliphatic hydrocarbon solvents, such as the straight and branched chain paraffins and cycloparaffins containing from 3 to 16 carbon atoms which include, without limitation, propane, pentane, hexane, petroleum, ether, heptane, dodecane, cycloheptane, cyclohexane, methyl cyclohexane, and the like. Aromatic solvents such as benzene, toluene, xylene, and the like are also operable. Mono-olefins can also be used as solvents when a catalyst system is used for which the olefin is immune to polymerization. For example, the alpha olefins are immune to polymerization with n-Bu lithium unless combined with a chelating compound such as symmetrical-di-methyl ethylene-diamine. Therefore, in the absence of such an effective catalyst system, olefins can be used as solvents, including butylenes, amylenes, hexenes, cyclohexene and the like. Polar compounds such as ethers and amines may also be present.

The same considerations as to purity and absence of interfering compounds applying to the monomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitably dehydrated by passage through silica gel, alumina, calcium chloride or other dehydrating or absorbing media, and thereafter distilled.

As in the case of the monomer, the solvent, after being purified, desirably should be handled in contact only with its own vapor or with atmospheres containing only its vapor and inert gases such as helium and argon.

Laboratory scale reactions may conveniently be conducted in glass beverage bottles sealed with aluminum lined crown caps. The bottles should be carefully cleaned and dried before use. The catalyst employed may be added to the bottle by weight, or, where possible, the catalyst can be melted and added by volume. The removal of oxygen from the free air space above the solution in the bottle as well as dissolved oxygen in the solution is an important step in the bottle loading procedure. The cap is placed loosely on the bottle and the mass is brought to a vigorous boil as by placing the bottle on a heated sand bath. When approximately 10% of the charge has been vented, the bottle is rapidly sealed with a metal cap having two or three openings and a rubber liner. Such procedure substantially excludes the air and oxygen which drastically inhibits reaction.

The sealed bottles may be placed on a polymerization wheel immersed in a liquid maintained at a constant temperature, and rotated. Alternatively, the charge bottle may be allowed to stand stationary in a constant temperature bath or otherwise heated or cooled until the conditioning reaction is complete. The bottle is then cooled and the desired amount of styrene introduced through the rubber liner by means of a syringe. Then the bottle is reheated and maintained at the desired temperature for an appropriate period.

The time for the preliminary reaction and for the grafting operation varies with the temperature, the time required decreasing with increase in temperature, in any case being completed within 3–6 hours, and at the higher temperatures in the cited range substantial reaction is effected within one-half hour.

After the grafting reaction has been completed, and the bottle cooled to handling temperature, the postreacted polymer may be removed by cutting the bottle open.

Small and large scale reactions can also be run in stainless steel stirred reactors. Corresponding techniques are employed in large scale processes. Usually the reaction will be carried out in a closed autoclave provided with a heat transfer jacket and a rotary agitator. Avoidance of oxygen contamination is most easily secured by evacuating the vessel prior to charging the reagent solution and employing an inert atmosphere. To insure the purity of the vinyl aryl monomer and solvent, a silica gel or other suitable adsorption column is preferably inserted in the charging line employed for introduction of these materials to the reactor. The catalyst solution or suspension is preferably charged from an auxiliary charging vessel pressured with an inert gas and communicating with the reaction vessel through a valved conduit. It is desirable to provide a reflux condenser to assist in the regulation of the reaction temperature.

The various tests performed on the products are carried out according to standard procedures. The analysis for block polystyrene is made by oxidation with osmium tetraoxide according tot he procedure published in Jour. Polymer Sci., vol. 1, No. 5, p. 429 (1946).

The invention is illustrated by the following examples.

These examples are given merely for purposes of illustration and are not intended in any way to restrict the scope of the invention nor the manner in which it can be practiced. Unless specified otherwise, parts and percentages are given by weight.

EXAMPLE I

A solution of polybutadiene in hexane is prepared by having a concentration of 75 parts by weight polybutadiene and 225 parts by weight of hexance. The polybutadiene has a number average molecular weight of 100,000 as determined by dilute solution viscosity. Aliquot portions of this solution are placed in a number of 28-ounce polymerization bottles, cleaned and purged of air, and other components added so that the composition and conditions in each case are:

Hexane _____ grams__ 225
Polybutadiene _____ do____ 75
n-BuLi _____ millimoles__ 1
Alkyl halide _____ do____ 10
Temperature _____ ° C__ 50
Conditioning time _____ hours__ 6

The specific alkyl halides are indicated below and the bottles are placed on a tumbling device in a polymerizer bath. After the 6 hour conditioning period, 25 grams of styrene are added to each bottle and the temperature maintained at 50° C. for another 6 hours. The product is recovered by dumping the reaction mass into methanol or isopropanol according to usual procedure. The results are tabulated below.

The control which uses no alkyl halide shows 14.32% block polystyrene. With the secondary alkyl chlorides the grafting is very effective in producing a greater number of short branches for the 25% styrene incorporated so there is only 1.2–1.33% block polystyrene. In contrast the normal and tertiary alkyl chlorides, as well as the secondary alkyl iodide and bromide, are much less effective in distributing the styrene in numerous small branches, and instead produce a fewer number of larger blocks representing 10.42–13.52% block polystyrene.

EXAMPLE II

The procedure of Example I is repeated a number of times using polyisoprene in place of polybutadiene, the proportions and conditions being as tabulated below:

Hexane _____ grams__ 225
Polyisoprene (mol. wt. 100,000) _____ do____ 75
n-BuLi _____ millimoles__ 1
Alkyl halide _____ do____ 10
Temperature _____ ° C__ 50
Reaction time _____ hours__ 6

After the polymer conditioning reaction, 25 grams of styrene are added to each of the reagent solutions and reaction continued at 50° C. for another 6 hours with the following results:

| Percent styrene | mM. n-BuLi | Alkyl halide Type | mM. | Percent conv. | DSV | Percent Gel | Block sytrene |
|---|---|---|---|---|---|---|---|
| 25 | 0.50 | Control | 0.0 | 100 | 2.11 | 0.00 | 13.45 |
| 25 | 0.50 | sec.-BuCl | 10.0 | 100 | 2.31 | 0.00 | 0.34 |
| 25 | 1.00 | t-BuCl | 10.0 | 100 | 2.41 | 0.00 | 10.64 |
| 25 | 1.00 | sec.-Amyl Cl | 10.0 | 100 | 3.10 | 0.00 | 0.24 |
| 25 | 1.00 | n-BuI | 10.0 | 100 | 2.63 | 0.00 | 9.48 |

EXAMPLE III

The procedure of Example I is repeated a number of times using individually in place of the n-BuLi of that example together with secondary butyl chloride equivalent amounts respectively of n-hexyl lithium, n-octyl lithium, n-BuNa, n-octyl Na, secondary butyl lithium, 3-octyl lithium, 3-amyl Na, t-butyl lithium and t-amyl lithium. Similar improvements in properties and low amounts of block polystyrene are noted as in Example I.

EXAMPLE IV

The procedure of Example I is repeated a number of times using individually in place of the styrene of that example together with secondary butyl chloride equivalent amounts respectively of vinyl toluene, isopropenyl benzene, vinyl naphthalene and vinyl diphenyl. Each product shows similar improvements in properties, and low amounts of block polymer are produced as in Example I.

EXAMPLE V

The procedure of Example I is repeated twice using in place of the polybutadiene, random copolymers of butadiene with 25% styrene, and of isoprene with 25% styrene. The products show similar improvements in properties, and low amounts of block polystyrene are produced as in Example I.

The invention claimed is:

1. A process for adding a plurality of short branches of vinyl aryl repeating units to a preformed polymeric diene selected from the class consisting of butadiene and isoprene containing at least 50 percent by weight of said diene comprising the steps of:
   (1) reacting said preformed diene polymer in a hydrocarbon solution with an alkyl lithium or alkyl sodium and a secondary alkyl chloride, said alkyl lithium or alkyl sodium being used in a proportion of 0.5–15 millimoles of Li or Na per 100 parts by weight of said preformed polymer and said secondary alkyl chloride being used in a proportion of 5–25

| Percent styrene | mM. n-BuLi | Alkyl halide Type | mM. | Percent conv. | DSV | Percent Gel | Block sytrene |
|---|---|---|---|---|---|---|---|
| 25 | 1.00 | Control | 0.0 | 100 | 1.30 | 0.00 | 14.32 |
| 25 | 1.00 | sec.-BuCl | 10.0 | 100 | 1.47 | 0.00 | 1.20 |
| 25 | 1.00 | n-BuCl | 10.0 | 100 | 1.78 | 0.00 | 10.53 |
| 25 | 1.00 | t-BuCl | 10.0 | 100 | 1.53 | 0.00 | 10.42 |
| 25 | 1.00 | sec.-Amyl Cl | 10.0 | 100 | 1.32 | 0.00 | 1.33 |
| 25 | 1.00 | Isopropyl Cl | 10.0 | 100. | 1.42 | 0.00 | 1.24 |
| 25 | 1.00 | sec.-BuI | 10.0 | 100 | 1.53 | 0.00 | 12.4 |
| 25 | 1.00 | sec.-BuBr | 10.0 | 100 | 1.92 | 0.00 | 13.53 | millimoles per millimole of Li or Na, said reaction being conducted at a temperature of 0–100° C. for a period of 0.1–8 hours;

(2) thereafter adding to the resulting polymeric product 5–50 parts by weight per 100 parts of preformed polymer a vinyl aryl compound selected from the class consisting of styrene, alphamethyl styrene, vinyl naphthalene and vinyl diphenyl and nuclear alkylated derivatives thereof in which the alkyl derivative groups have no more than a total of 10 carbon atoms per molecule; and (3) reacting said vinyl aryl compound with said polymeric product at a temperature of 0–100° C. for a period of 0.5–8 hours;

the diene polymer comprising 100–50 percent by weight of butadiene or isoprene and 0–50 percent by weight of a vinyl aryl monomer selected from the class consisting of monovinyl and monoisopropenyl derivatives of benzene and naphthalene and nuclear-substituted derivatives thereof in which the derivative groups have no more than a total of 12 carbon atoms and the derivative groups are selected from the class consisting of alkyl, aryl, cycloalkyl, alkaryl and aralkyl groups.

2. The process of Claim 1 in which said conditioning reaction and said vinyl aryl compound reaction are both performed at a temperature in the range of 30–50° C.

3. The process of Claim 2 in which both said reactions are carried out for a period of 1–6 hours.

4. The process of Claim 3 in which said vinyl aryl compound is styrene.

5. The process of Claim 4 in which alkyl lithium is used in the conditioning reaction.

6. The process of Claim 5 in which said alkyl lithium is n-butyl lithium.

7. The process of Claim 6 in which said secondary alkyl chloride is secondary butyl chloride.

8. The process of Claim 6 in which said secondary alkyl chloride is secondary amyl chloride.

9. The process of Claim 6 in which said secondary alkyl chloride is isopropyl chloride.

10. The process of Claim 5 in which said preformed polymer is a butadiene homopolymer.

11. The process of Claim 5 in which said preformed polymer is an isoprene homopolymer.

12. The process of Claim 10 in which said homopolymer has a molecular weight of 30,000–120,000.

13. The process of Claim 1 in which said preformed polymer has a molecular weight of 30,000–120,000.

14. A grafted polymeric product produced according to the process of Claim 1 and having less than 10% of the vinyl aryl compound grafted thereto in the form of block repeating units.

References Cited

UNITED STATES PATENTS

| | | | |
|---|---|---|---|
| 3,492,369 | 1/1970 | Naylor | 260—880 |
| 3,607,846 | 9/1971 | Halasa et al. | 260—94.7 |
| 3,719,730 | 3/1973 | Hansley | 260—94.7 |
| 3,661,873 | 5/1972 | Halasa et al. | 260—94.7 |

FOREIGN PATENTS

| | | | |
|---|---|---|---|
| 873,656 | 7/1961 | Great Britain | 260—877 |

MURRAY TILLMAN, Primary Examiner

C. J. SECCURO, Assistant Examiner

US. Cl. X.R.

260—880 R, 880 B